Patented Dec. 15, 1953

2,662,859

UNITED STATES PATENT OFFICE 2,662,859

COMPOSITIONS AND PROCESS FOR EMULSION BREAKING

Willard H. Kirkpatrick, Sugar Land, Tex., assignor to Visco Products Company, Houston, Tex., a corporation of Delaware No Drawing. Application June 15, 1949, Serial No. 99,334

11 Claims. (Cl. 252—331)

This invention relates in particular to the treatment of emulsions of mineral oil and water, such as petroleum emulsions commonly encountered in the production, handling and refining of crude mineral oil, for the purpose of separating the oil from the water. Also, the invention relates to the treatment of other water-in-oil type of emulsions wherein the emulsions are produced artificially or naturally and the resolution of the emulsions presents a problem of recovery or disposal.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B. S.".

One type of process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

Another type of process involves the use of a demulsifying agent of the kind hereinafter described in acidizing operations on petroleum producing strata. In such an operation corrosion inhibited acid is forced down the well and into the formation under pressure. The acid attacks limestone formation enlarging the fissures and openings through which the oil fluids flow to the well pool, thus increasing the production. In many cases, particularly troublesome emulsions are encountered immediately after a well has been acidized. This condition can be minimized and many times eliminated by incorporating a suitable demulsifying composition with the acidizing medium.

Still another type of process involves the use of a demulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A demulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

One object of my invention is to provide a novel and economical process for resolving emulsions of the character referred to into their component parts of oil and water or brine.

Another object is to provide a novel reagent which is water-wettable, interfacial and surface-active in order to enable its use as a demulsifier or for such uses where surface-active characteristics are necessary or desirable.

The treating agents employed in accordance with the present invention consist of compositions of high molecular weight which are diethers of polyoxyalkylene diols wherein the major proportion of the molecular weight is attributable to oxypropylene groups (e. g., oxy 1,2-propylene) or to mixed oxyethylene and oxypropylene groups in which the weight ratio of oxyethylene to oxypropylene does not exceed 4:1. Where the oxyalkylene groups consist of oxyethylene and oxypropylene groups, the minimum molecular weight should be at least 1000. Where the oxyalkylene groups consists solely of oxypropylene groups, the minimum molecular weight should be at least 1350 and preferably at least 2000. The best results have been obtained where the oxyalkylene groups consist of 50% to 100% by weight of oxypropylene groups. With the foregoing limitations the molecular weights of the compounds employed for the purpose of the invention are preferably within the range of 1500 to 7500.

It has been discovered that these compositions have unusual and unexpected properties for resolving water-in-oil emulsions into their component parts. One possible theory which may be postulated for the striking effectiveness of these compositions in resolving petroleum emulsions is a hydrophobe-hydrophile balance which has not been secured heretofore with compositions well known in this art.

The preferred compositions contemplated for use in accordance with this invention are exemplified by the following structural formula:

$$R'(OC_nH_{2n})_xR$$

wherein R' is an alkyl radical and R is an oxyalkyl radical and the terminal ether groups may be the same or different, n is 3 or both 2 and 3 in a single molecule and x is equal to the number of times n is 3 or is the sum of the number of times n has a value of 2 plus the number of times that n has a value of 3 and the maximum ratio of n having a value of 2 to n having a value of 3 is such that the maximum weight ratio of oxyethylene to oxypropylene does not exceed 4 to 1, it being further understood that the molecular weight of said composition is in excess of 1,000 when both the oxyethylene and the oxypropylene groups are present in the same molecule and at least 1350, preferably at least 2000, when the oxyalkylene groups consist solely of oxypropylene groups.

Other illustrative compositions suitable for the practice of the invention have the same general formula, where n and x have the same significance, R is oxyaralkyl, oxycycloalkyl or oxyaryl, and R' is alkyl, aralkyl, cycloalkyl or aryl.

All of the compounds employed for the purpose of this invention are characterized by the nucleus

wherein n has a value of 3, or both 2 and 3 in a ratio such that the weight ratio of oxyethylene to oxypropylene does not exceed 4 to 1, and a major proportion, preferably at least 60% by weight of the compound, is attributable to this nucleus.

These demulsifying compounds employed for the purposes of the invention may also be described as being surface active and water-wettable, and those which do not possess a nitrogen atom, a sulfonic group, and/or a carboxyl group within the molecule may be described as being non-ionic in that they do not ionize to yield organic cations or organic anions.

The compounds employed in accordance with this invention may be prepared in several ways. For example, U. S. Patent 2,425,845 describes the method of preparing hetero polyoxyalkylene diols. Briefly, good results may be obtained by placing a mixture containing the ethylene oxide and the propylene oxide into intimate contact with a dihydroxy aliphatic alcohol, in a liquid phase throughout which a suitable catalyst is uniformly dispersed. For best results, it is essential that the addition reaction be carried out under conditions which are controlled with respect to such factors as the amount of active catalyst employed and the uniformity of its dispersion, the amount of unreacted alkylene oxides present at all stages during the reaction, the temperature maintained throughout the course of the reaction and particularly the intimacy and uniformity of contact of the reactants during the process. As a catalyst, sodium hydroxide or potassium hydroxide is preferred in an amount which is about 0.2 to 1% by weight of the reactants. Excessive concentrations of unreacted alkylene oxides are to be avoided and pressures of 5 to 50 pounds per square inch are preferred for reaction conditions.

The preparation of monoethers of hetero polyoxyalkylene diols has been described in U. S. Patent 2,425,755. Briefly, these products are prepared by placing the ethylene oxide and propylene oxide mixture into intimate contact with the monohydroxy alcohol in a liquid phase throughout which a suitable catalyst is uniformly dispersed. As a catalyst, sodium hydroxide or potassium hydroxide is preferred in an amount which is about 0.2% to 1% by weight of the total amount of reactants. All of the catalyst need not be added at the start of the reaction. The reaction can be successfully carried out at temperatures of 80 degrees C. to 160 degrees C. which is sufficiently high to favor rapid reaction of the alkylene oxides. Pressures comparable for the manufacture of the diols have been found to be satisfactory for production of the monoethers. Excessive concentrations of unreacted alkylene oxide are also avoided. In order to discourage the formation of undesired side reaction products, the vessel is preferably swept out with gaseous nitrogen to remove oxygen which is conducive to undesired side reactions.

The above reaction may be represented by the following equation where the mixture of ethylene oxide and propylene oxide is used.

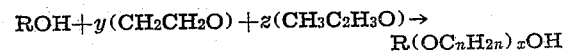

In the foregoing equation, ROH is an aliphatic monohydroxy alcohol; y and z represent the moles of ethylene oxide and 1,2-propylene oxide respectively; n is both 2 and 3 in a single molecule, the total number of times n has a value of 2 being equal to y and the total number of times n has a value of 3 being equal to z; and x is the total number of such oxyalkylene groups, being equal to y plus z. Methods of effecting this reaction with the mixed oxides and the resultant compositions have been described in U. S. Patent 2,425,755. Certain modifications of this general reaction may be employed to produce compositions of the practice of the present invention, e. g., in place of the aliphatic monohydroxy alcohol (ROH), the alkylene or mixed oxides may be reacted with a polyoxyalkylene monohydroxy alcohol prepared by this or some other route, to result in a product of the same chemical nature but of increased molecular weight because of the increased length of the polyoxyalkylene chain.

Another way in which the same class of products may be prepared is to effect the reaction of an alkyl, aryl, cycloalkyl, or aralkyl halide with an alkali metal alcoholate. Much work on this general preparative scheme has been done by Hibbert and his co-workers (see e. g., Journal American Chemical Society, vol. 61, p. 1905). The two equations given below illustrate the reaction involved.

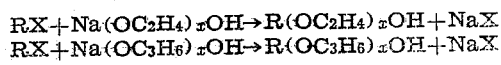

In these equations, R represents alkyl, aralkyl, aryl or cycloalkyl, x is a whole number, and X is halogen, e. g., chlorine or bromine. For convenience, polyoxyethylene glycols and polyoxypropylene glycols have been used for illustration, but it will be understood that polyoxyalkylene glycols containing both oxyethylene and oxypropylene groups in the same molecule will undergo the same type of reaction.

The symmetrical diethers of the hetero polyoxyalkylene diols may be prepared by reaction of two molecular proportions of the desired alkyl, aryl, aralkyl or cycloalkyl halide with one molecular proportion of the disodium salt of the hetero polyoxyalkylene diol according to the following equation:

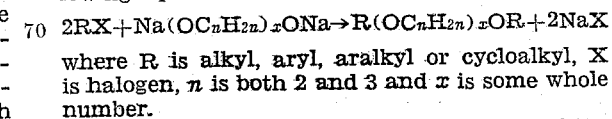

where R is alkyl, aryl, aralkyl or cycloalkyl, X is halogen, n is both 2 and 3 and x is some whole number.

By starting with the dihalide derivative of the hetero polyoxyalkylene diol and reacting one molecular proportion thereof with two molecular proportions of a sodium alcoholate, the same type of products will result.

One may start with the monoether of a hetero polyoxyalkylene diol prepared in accordance with the procedure outlined above and react it with sodium to give the corresponding alcoholate. This alcoholate may then be reacted in accordance with Equation 1 below with any desired alkyl halide to yield diethers of the hetero polyoxyalkylene diol or in accordance with Equation 2 with an alkylene dihalide to give a diether of a hetero polyoxyalkylene diol. These reactions are illustrated in the following two equations:

(1) 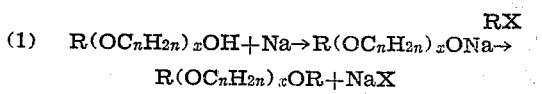

where R is alkyl, X is halogen, $n$ is both 2 and 3 and $x$ is a whole number such that the molecular weight is at least 1000.

(2) 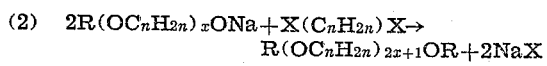

where R, $n$, and X have the same significance as in the previous equation.

Although the above procedures have been discussed under the heading of the preparation of symmetrical diethers, it is to be understood that by proper choice of the reaction procedure unsymmetrical diethers can be prepared which are suitable for the purpose of this invention.

Since as indicated above it is possible to prepare the compositions of this invention by various routes and from a number of different classes of starting materials the invention should not be limited by the following examples which are merely intended to illustrate some satisfactory procedures for preparing a few of the materials suitable for employment within the scope of the present invention.

EXAMPLE I

A solution of sodium isopropoxide was prepared from sodium and substantially anhydrous isopropanol. To 205 parts of this 0.1 M. solution was added 340 parts of the monobutyl ether of a polyoxyalkylene diol in which the polyoxyalkylene chain contained oxyethylene groups and oxypropylene groups in an approximately 1:1 weight ratio and the total molecular weight was approximately 1700. The reaction mixture was refluxed for one hour and the isopropanol was removed under reduced pressure until the theoretical amount had been secured.

The resulting sodium salt of the monoether diol was cooled and 13.7 parts of butyl bromide was added drop-wise with stirring over a period of about 30 minutes. The temperature of the reaction mass was allowed to rise with stirring to 110 degrees C. until a test for alkalinity to phenolphthalein was negative which required about 1 hour. The reaction mixture was then diluted with isopropanol to facilitate the subsequent filtration in order to remove the precipitated sodium bromide. The isopropanol was then removed by heating to 100 degrees C. under reduced pressure to yield the dibutyl ether of a heteric polyoxyalkylene diol.

EXAMPLE II

Following the procedure of Example I, 172 parts of the same sodium salt of the monobutyl ether diol was reacted with 19.3 parts of bromooctane to yield the monobutyl-monooctyl diether of a heteric polyoxyalkylene diol.

EXAMPLE III

Following the procedure of Example I, 172 parts of the sodium salt of the monobutyl ether diol was reacted with 24.9 parts of lauryl bromide to yield the monobutyl-monolauryl diether of a heteric polyoxyalkylene diol.

EXAMPLE IV

Following the procedure of Example I, 86.2 parts of the sodium salt of the monobutyl ether diol was reacted with 15.3 parts of cetyl bromide to yield the monobutyl-monocetyl diether of a heteric polyoxyalkylene diol.

EXAMPLE V

Following the procedure of Example I, 172 parts of the sodium salt of the monobutyl ether diol was reacted with 16.3 parts of cyclohexyl bromide to yield the monobutyl-monocyclohexyl diether of a heteric polyoxyalkylene diol.

EXAMPLE VI

Following the procedure of Example I, 172 parts of the sodium salt of the monobutyl ether diol was reacted with 17.1 parts of benzyl bromide to yield the monobutyl-monobenzyl diether of a heteric polyoxyalkylene diol.

EXAMPLE VII

The disodium salt of polyoxypropylene diol having a molecular weight of 1200 was prepared according to conventional procedures using 240 parts of the diol and 410 parts of sodium isopropoxide.

In a suitable reaction flask 122 parts of the resulting disodium salt of the diol was reacted with 27 parts of butyl bromide in accordance with the procedure of Example I to yield the dibutyl ether of a polyoxypropylene diol having a molecular weight of 1200.

EXAMPLE VIII

Following the procedure as outlined in Example VII, the disodium salt of a polyoxypropylene diol having a molecular weight of 2000 was prepared. From the resulting disodium salt of the diol there was prepared the dicetyl ether in accordance with conventional procedures.

EXAMPLE IX

The disodium salt of a polyoxyalkylene diol, the polyoxyalkylene chain of which contained oxyethylene groups and oxypropylene groups in a 3:1 weight ratio and the total molecular weight of which was approximately 2200, was prepared. By reacting octyl bromide with the resulting disodium salt the dioctyl ether of a heteric polyoxyalkylene diol was prepared.

EXAMPLE X

The monobutyl ether of polyoxypropylene diol having a molecular weight of 2000 was prepared according to one of the procedures outlined. The resulting monobutyl ether of the diol was then converted to the monosodium salt monobutyl ether derivative. This derivative was then reacted with octyl bromide to yield the unsymmetrical monobutyl-monooctyl diether of a polyoxypropylene diol.

In a similar manner the monobutyl ether of a polyoxyalkylene diol containing oxyethylene groups and oxypropylene groups in an approximately 1:1 weight ratio and having a total molecular weight of approximately 5100 may be substituted for the polyoxyalkylene diol derivative having a molecular weight of 1700 in Examples I through VI to produce another series of symmetrical and unsymmetrical diethers.

The diether compositions may be treated with solvents or diluents prior to actual use in breaking water-in-oil emulsions. Among the solvents or diluents which may be used are water, isopropanol, sulfur dioxide ($SO_2$) extract. This latter material is a by-product from the Edeleanu process of refining petroleum in which the undesirable fractions are removed by extraction with liquid sulfur dioxide. After removal of the sulfur dioxide, a mixture of hydrocarbons, substantially aromatic in character, remains which is designated in the trade as $SO_2$ extract. Examples of other suitable hydrocarbon solvents are Gray Tower polymers, toluene, xylene, gas oil, diesel fuel, Bunker fuel and coal tar solvents.

The demulsifying compositions are preferably employed in the proportion of one part of the active reagent to from 2000 to 50,000 parts of emulsion, either by adding the concentrated product directly to the emulsion or after diluting with a suitable vehicle in the customary manner.

In plant operations good results have been obtained by employing a treating ratio of one gallon of chemical per 250 to 260 barrels of net oil, that is, oil after the removal of the water. The treating system may comprise the usual separator, gun barrel and chemical proportioning pump to add the chemical treating agent.

In a series of tests on an emulsion from a well in the Hastings, Texas, field at a temperature of 140 degrees F. using ratios of the treating chemical equivalent to one gallon to approximately 250 barrels of net oil on an emulsion containing about 18% emulsified water, a number of compositions containing mixed terminal ether linkages in which one butyl ether group remained constant and the other ether linkage consisted of octyl, lauryl, cetyl, benzyl and cyclohexyl, all dropped out substantially all of the water in the emulsion after agitation followed by standing in a quiescent state for 25 minutes. The efficiency and speed of resolution for this particular emulsion increased as the molecular weight of the ether group increased.

In the previous description, frequent reference has been made to heteric polyoxyalkylene diols and by the word "heteric" is meant that the diol constituents of the mixture vary in internal configuration from molecule to molecule, such variations arising out of a randomness of the distribution of the oxyethylene and the oxypropylene groups therein, as results, for example, from the concurrent reaction of the ethylene oxide and the propylene oxide on the starting material and the intermediate products.

Throughout the specification and claims the following definitions apply:

Alkyl—a monovalent radical derived from an aliphatic hydrocarbon by removal of one hydrogen atom, as, for example, methyl, ethyl, propyl, octyl, cetyl, myricyl and their homologues, preferably containing 1 to 30 carbon atoms;

Aralkyl—a monovalent radical derived from an aromatic substituted aliphatic hydrocarbon, as, for example, benzyl, phenylethyl, phenylpropyl, phenylbutyl, phenyloctyl, phenylcetyl, phenyloctadecyl and homologues, preferably containing 1 to 30 carbon atoms in the alkyl chain;

Cycloalkyl—a monovalent radical derived from a cycloaliphatic hydrocarbon, as, for example, cyclopentyl, cyclohexyl and cycloheptyl;

Aryl—a monovalent radical derived from an aromatic hydrocarbon by removal of one hydrogen atom, as, for example, phenyl and naphthyl;

Oxyalkyl—a monovalent radical derived from an aliphatic alcohol by removal of the hydrogen atom of an alcoholic hydroxyl, as, for example, methoxy, ethoxy, propyloxy, octyloxy, cetyloxy, myricycloxy, and homologues thereof, preferably containing 1 to 30 carbon atoms;

Oxyaralkyl—a monovalent radical derived from an aralkyl alcohol by removal of the hydrogen atom of an alcoholic hydroxyl, as, for example, —O—$CH_2C_6H_5$, —O—$C_2H_4C_6H_5$, oxypropylphenyl, oxybutylphenyl, oxyoctylphenyl, oxycetylphenyl, oxyoctadecylphenyl, and homologues thereof, preferably containing 1 to 30 carbon atoms in the alkyl chain;

Oxyaryl—a monovalent radical derived from a phenol by removal of the hydrogen of the phenolic hydroxy, as, for example, phenoxy, naphthoxy, and homologues thereof;

Oxycycloalkyl—a monovalent radical derived from a cycloaliphatic alcohol by removal of the hydrogen of the alcoholic hydroxy, as, for example, cyclopentyloxy, cyclohexyloxy, cycloheptyloxy, and homologues;

Halogen—one of the atoms chlorine, bromine, iodine or fluorine;

Halide—a salt containing a halogen atom as the anion.

The products prepared in accordance with the invention are very useful in breaking petroleum emulsions, especially those in which the oil is paraffinic or paraffinic-naphthenic, and have been successfully used in breaking water-in-oil petroleum emulsions in the Mid-Continent oil fields, including Oklahoma, Illinois, Kansas, the Gulf Coast, Louisiana, Southwest Texas and California.

This application is a continuation-in-part of copending application, Serial No. 98,162, filed June 9, 1949.

The invention is hereby claimed as follows:

1. A process of breaking water-in-oil emulsions which comprises treating such emulsions with a diether of a polyoxyalkylene aliphatic diol in which the major proportion of the average molecular weight is attributable to oxyalkylene groups from the group consisting of oxypropylene groups and mixed oxyethylene and oxypropylene groups having a weight ratio of oxyethylene to oxypropylene not exceeding 4:1 and the average molecular weight is at least 1000 where the oxyalkylene groups are both oxyethylene and oxypropylene and at least 1350 where the oxyalkylene groups are solely oxypropylene groups.

2. A process of breaking water-in-oil emulsions which comprises treating such emulsions with a diether of a polyoxyalkylene aliphatic diol in which the major proportion of the average molecular weight is attributable to oxyalkylene groups from the class consisting of oxypropylene groups and mixed oxyethylene and oxypropylene groups having a weight ratio of oxyethylene to oxypropylene not exceeding 4:1 and the average molecular weight is within the range of 1500 to 7500.

3. A process of breaking water-in-oil emulsions which comprises treating such emulsions with an unsymmetrical diether of a polyoxyalkylene aliphatic diol in which the major proportion of the average molecular weight is attributable to oxyalkylene groups from the group consisting of oxypropylene groups and mixed oxyethylene and oxypropylene groups having a weight ratio of oxyethylene to oxypropylene not exceeding 4:1 and the average molecular weight is at least 1000 where the oxyalkylene groups are both oxyethylene and oxypropylene and at least 1350 where the oxyalkylene groups are solely oxypropylene groups.

4. A process of breaking water-in-oil emulsions which comprises treating such emulsions with a di(alkyl ether) of a polyoxyalkylene aliphatic diol in which the major proportion of the average molecular weight is attributable to oxyalkylene groups from the group consisting of oxypropylene groups and mixed oxyethylene and oxypropylene groups having a weight ratio of oxyethylene to oxypropylene not exceeding 4:1 and the average molecular weight is at least 1000 where the oxyalkylene groups are both oxyethylene and oxypropylene and at least 1350 where the oxyalkylene groups are solely oxypropylene groups.

5. A process of breaking water-in-oil emulsions which comprises treating such emulsions with a diether of a polyoxyalkylene aliphatic diol in which the major proportion of the average molecular weight is attributable to oxyalkylene groups from the group consisting of oxypropylene groups and mixed oxyethylene and oxypropylene groups having a weight ratio of oxyethylene to oxypropylene not exceeding 4:1 and the average molecular weight is at least 1000 where the oxyalkylene groups are both oxyethylene and oxypropylene and at least 1350 where the oxyalkylene groups are solely oxypropylene groups, the ether groups being terminal groups and one of them being a butyl group.

6. A process of breaking water-in-oil emulsions which comprises treating such emulsions with a diether of a polyoxyalkylene aliphatic diol having an average molecular weight of at least 1000 and characterized by a molecular structure in which the oxyalkylene groups are mixed oxyethylene and oxypropylene groups in a weight ratio of oxyethylene to oxypropylene not exceeding 4:1, the oxyalkylene groups constituting at least 60% by weight of the average molecular weight of said diether and the oxypropylene groups constituting at least 50% by weight of the oxyalkylene groups.

7. A process of breaking water-in-oil emulsions which comprises treating such emulsions with a diether of a polyoxyalkylene aliphatic diol having an average molecular weight of at least 2000 and characterized by a molecular structure in which the oxyalkylene groups consist solely of oxypropylene groups, the oxypropylene groups constituting a major proportion of the average molecular weight of said diether.

8. A process of breaking water-in-oil emulsions which comprises treating such emulsions with a diether of an oxyethylene oxy 1,2-propylene aliphatic diol having an average molecular weight in excess of 1000 and characterized by a molecular structure composed principally of oxyethylene and oxy 1,2-propylene groups, the weight ratio of oxyethylene to oxy 1,2-propylene groups not exceeding 4:1, the oxyalkylene groups constituting at least 60% by weight of the average molecular weight of said diether and the oxypropylene groups constituting at least 50% by weight of the oxyalkylene groups.

9. A process of breaking water-in-oil emulsions which comprises treating such emulsions with a diether of a polyoxyalkylene aliphatic diol having an average molecular weight within the range of 1500 to 7500 and characterized by a molecular structure in which the oxyalkylene groups are mixed oxyethylene and oxypropylene groups in a weight ratio of oxyethylene to oxypropylene not exceeding 4:1, the oxyalkylene groups constituting at least 60% by weight of the average molecular weight of said diether and the oxypropylene groups constituting at least 50% by weight of the oxyalkylene groups.

10. A process of breaking water-in-oil emulsions which comprises treating such emulsions with a diether of a polyoxyalkylene aliphatic diol having an average molecular weight within the range of 1500 to 7500 and characterized by a molecular structure in which the oxyalkylene groups consist solely of oxy 1,2-propylene groups, the oxyalkylene groups constituting at least 60% by weight of said diether.

11. A process of breaking water-in-oil emulsions which comprises treating such emulsions with a diether of an oxyethylene oxy 1,2-propylene aliphatic diol having an average molecular weight within the range of 1500 to 7500 and characterized by a molecular structure composed principally of oxyethylene and oxy 1,2-propylene groups, the weight ratio of oxyethylene to oxy 1,2-propylene groups not exceeding 4:1, the oxyalkylene groups constituting at least 60% by weight of the average molecular weight of said diether and the oxypropylene groups constituting at least 50% by weight of the oxyalkylene groups.

WILLARD H. KIRKPATRICK.

References Cited in the file of this patent

UNITED STATES PATENTS

| Number | Name | Date |
|---|---|---|
| 2,233,383 | De Groote et al. | Feb. 25, 1941 |
| 2,307,058 | Moeller | Jan. 5, 1943 |
| 2,330,474 | De Groote | Sept. 28, 1943 |
| 2,430,002 | De Groote | Nov. 4, 1947 |
| 2,481,278 | Ballard et al. | Sept. 6, 1949 |
| 2,486,024 | Hearne et al. | Oct. 25, 1949 |